United States Patent
Bosch et al.

(10) Patent No.: US 10,414,228 B2
(45) Date of Patent: Sep. 17, 2019

(54) WHEEL CARRIER FOR A MOTOR VEHICLE

(71) Applicant: AUDI AG, Ingolstadt (DE)

(72) Inventors: Jakob Bosch, Ingolstadt (DE);
Vladimir Idelevitch, Nürnberg (DE)

(73) Assignee: AUDI AG, Ingolstadt (DE)

( * ) Notice: Subject to any disclaimer, the term of this patent is extended or adjusted under 35 U.S.C. 154(b) by 154 days.

(21) Appl. No.: 15/782,408

(22) Filed: Oct. 12, 2017

(65) Prior Publication Data
US 2018/0111435 A1    Apr. 26, 2018

(30) Foreign Application Priority Data
Oct. 25, 2016    (DE) .................. 10 2016 220 925

(51) Int. Cl.
*B60G 7/00*    (2006.01)
*B62D 7/18*    (2006.01)
*B60G 3/18*    (2006.01)

(52) U.S. Cl.
CPC .............. *B60G 7/008* (2013.01); *B60G 3/18* (2013.01); *B60G 7/001* (2013.01); *B62D 7/18* (2013.01); *B60G 2204/1482* (2013.01); *B60G 2206/50* (2013.01)

(58) Field of Classification Search
CPC .......... B60G 7/008; B60G 7/001; B62D 7/18
See application file for complete search history.

(56) References Cited

U.S. PATENT DOCUMENTS

| | | | | |
|---|---|---|---|---|
| 6,099,003 A * | 8/2000 | Olszewski | ............. | B62D 7/18 280/124.125 |
| 6,616,156 B1 * | 9/2003 | Dudding | ............. | B62D 7/18 280/93.512 |
| D538,316 S * | 3/2007 | Sadanowicz | ............. | D15/143 |
| 7,234,712 B2 * | 6/2007 | Yamazaki | ............. | B60G 3/20 280/93.51 |
| 7,862,057 B2 * | 1/2011 | Hilmann | ............. | B60G 3/20 280/93.511 |
| 9,463,677 B2 * | 10/2016 | Czerr | ............. | B60G 3/202 |
| 9,855,806 B1 * | 1/2018 | Jo | ............. | B60G 3/00 |
| 2017/0225531 A1 * | 8/2017 | Klinger | ............. | B60G 7/006 |
| 2018/0086377 A1 * | 3/2018 | Kleemann | ............. | B60G 3/202 |

FOREIGN PATENT DOCUMENTS

FR    2861335 B1    2/2006

\* cited by examiner

*Primary Examiner* — Faye M Fleming
(74) *Attorney, Agent, or Firm* — Maier & Maier, PLLC

(57) ABSTRACT

A wheel carrier for a motor vehicle, with a base element carrying a wheel bearing, at least one bearing point for a detachable connection to a link provided with a link connection region, as well as at least one bearing point for a detachable connection to a link connection region provided at a link. The first link connection region and the second connection region are designed as separate components and the first link connection region and the second connection region are detachably connected by a fastener to the base element.

8 Claims, 3 Drawing Sheets

WHEEL CARRIER FOR A MOTOR VEHICLE

FIELD

The invention relates to a wheel carrier for a motor vehicle.

BACKGROUND OF THE INVENTION

From FR 2 861 335 B1 is known a wheel carrier for a motor vehicle, which comprises a wheel bearing supporting a first wheel carrier component as well as a second wheel carrier attached at the first wheel carrier component. The second wheel carrier component is in this case designed as a single part which has a substantially rectangular form. In order to link it to the steering arm, the frame-shaped second wheel carrier component is provided with an upper and with a lower link region, wherein each is equipped with at least one bearing point. In order to enable a camber modification of lateral force when driving through a curve, the frame-shaped second wheel carrier component is attached via flexible element to the first wheel carrier component.

SUMMARY OF THE INVENTION

The objective of the invention is to provide a wheel carrier for a motor vehicle, which is designed in such a way that a modular design is enabled with a small installation space requirement, while the variance of the components is reduced.

The wheel carrier for a motor vehicle comprises a base element carrying in a known manner a wheel bearing, as well as a first and a second link connection region, wherein the link connection regions are respectively provided with at least one bearing point for a detachable connection to a link.

In the following, under the term link connection region, should be considered a link connection region that is associated with the upper link plane in the upper direction of the motor vehicle, and correspondingly, as the lower link connection region should be considered a lower region associated with the lower plane.

According to the invention, the first and the second link connection regions are formed as separate components and the first link connection region and/or the second link connection region are detachably connected via a fastening means to the base element.

Thanks to this design, the first and the second link connection regions can be provided in an advantageous manner as separate components, which, in comparison to prior art according to FR 2 861 335 B1—enable an installation space-saving construction. Another advantage is that a certain amount of modularity is provided, because while the basic components which are essential for the wheel carrier are maintained, in particular in the base element carrying the wheel bearing, adaptation to different model series is enabled in a simple manner with the aid of a correspondingly adapted first and/or second link connection regions.

A particularly advantageous embodiment of the invention provides that a decoupling element is arranged between the base element and the first link connection region, or between the base element and the second connection region, or between the base element and the first link connection region, as well as between the base element and the second link connection region. The arrangement of the decoupling element according to the invention proves to be particularly advantageous because in addition to the already mentioned variance due to the base element which always remains the same, an acoustic decoupling is additionally also made possible.

In particular in view of the increasing electrification of motor vehicles and the resulting effort to reduce the vehicle noise or roller noise in the interior space, this embodiment proves to be particularly advantageous.

It is in this case preferred when the decoupling element is formed from an elastomeric material. In addition to good acoustically decoupling characteristics, the use of an elastomeric material ensures in particular a long lifespan.

According to one embodiment of the invention it is provided that the decoupling element is vulcanized on the base element or at the first link connection region and/or at the second connection region. A loss-free tight fit and thus also a simple assembly are thus ensured in this manner.

According to a more cost-effective alternative, the fastening means is designed in the form of a separate insert, which can be interposed during the assembly between the base element and the first link connection region and/or the second link connection region.

In a particularly preferred embodiment of the invention, the fastening means is tensioned against a decoupling layer. This results in the effect wherein the transmission path is acoustically decoupled in this manner also by means of the tensioning, so that acoustic decoupling is obtained not only on the base element, or on the first and/or second link connection region, but also on the transmission path.

The decoupling means associated with a fastening means can in this case be arranged both on the base element as well as on the first and/or second link connection region and on the fastening means.

It is in this case preferred when the decoupling layer is again formed from an elastomeric material. In order to ensure a loss-free arrangement, it can be provided that the decoupling layer is vulcanized at the fastening means, at the base element or the first and/or second link connection region. However, it is also conceivable that the decoupling layer that is associated with the fastening means is designed as a separate, interposed insert, which is accordingly arranged between the fastening means and the base element, or between the fastening means and the first and/or second link connection means.

In order to ensure a simple and fast assembly, the fastening means can be designed for example in the form of screws.

BRIEF DESCRIPTION OF THE DRAWINGS

Further advantages and possible applications of the present invention will become evident from the following description in conjunction with the embodiment illustrated in the figures.

The figures show the following.

DETAILED DESCRIPTION OF THE DRAWINGS

Figure 1:
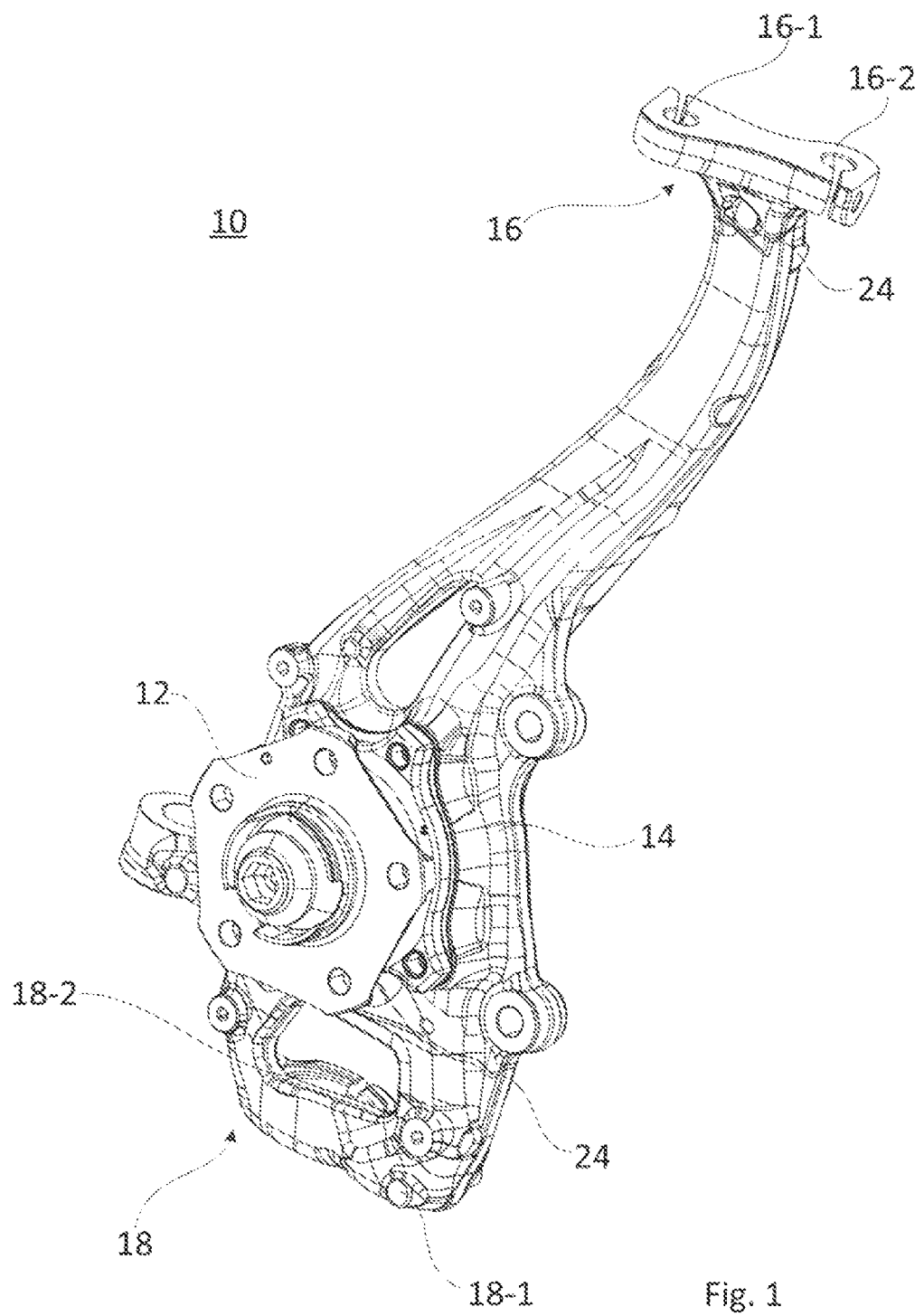
FIG. 1 a wheel carrier according to the invention.

FIG. 1 shows a wheel carrier, generally designated by the reference number 10, for a motor vehicle. The wheel carrier 10 comprises a base element 14 carrying a wheel bearing 12. To the base element 14 is connected in the assembled state of the wheel carrier 10 to a first link connection region 16 that is associated with a first link connection plane, hereinafter referred to as an upper link connection region, as well as a second link connection region 18 that is associated with a lower link plane, hereinafter referred to as a lower link connection region.

The upper link connection region 16 is in the present case provided with a plurality of attachment points, in particular bearing points 16-1 and 16-2, by means of which the upper link connection region 16 can be detachably connected to the link at the upper link plane.

Accordingly, the lower link connection region 18 is also provided with a plurality of link connection regions, in particular bearing points 18-1 and 18-2 by means of which the lower link can be detachably connected to the link at the lower link plane.

Figure 2:
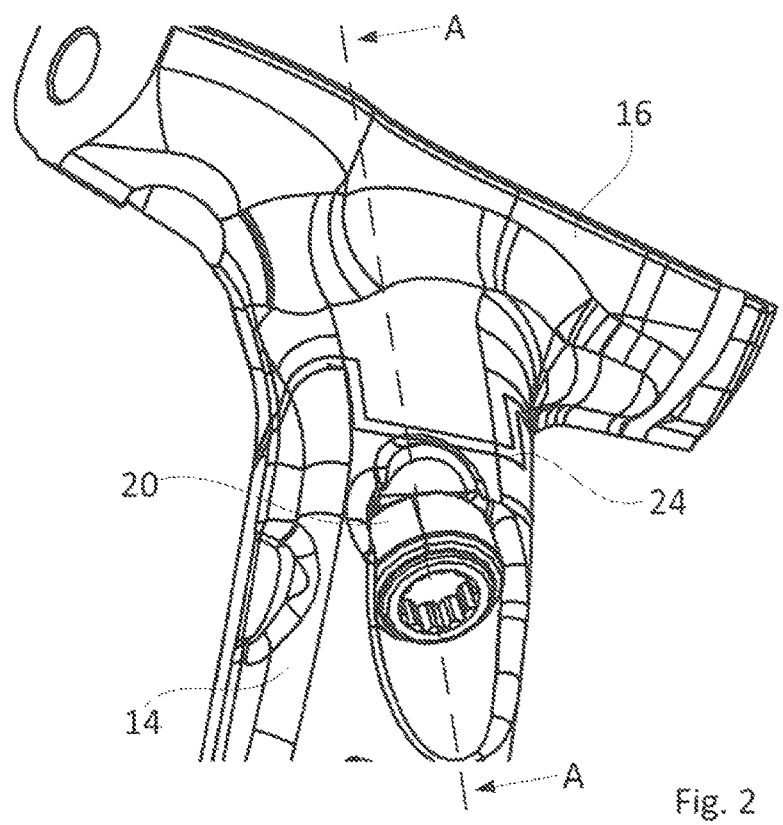
FIG. 2 an enlarged rear view illustration of the upper link connection region of the wheel carrier of FIG. 1.
Figure 4:
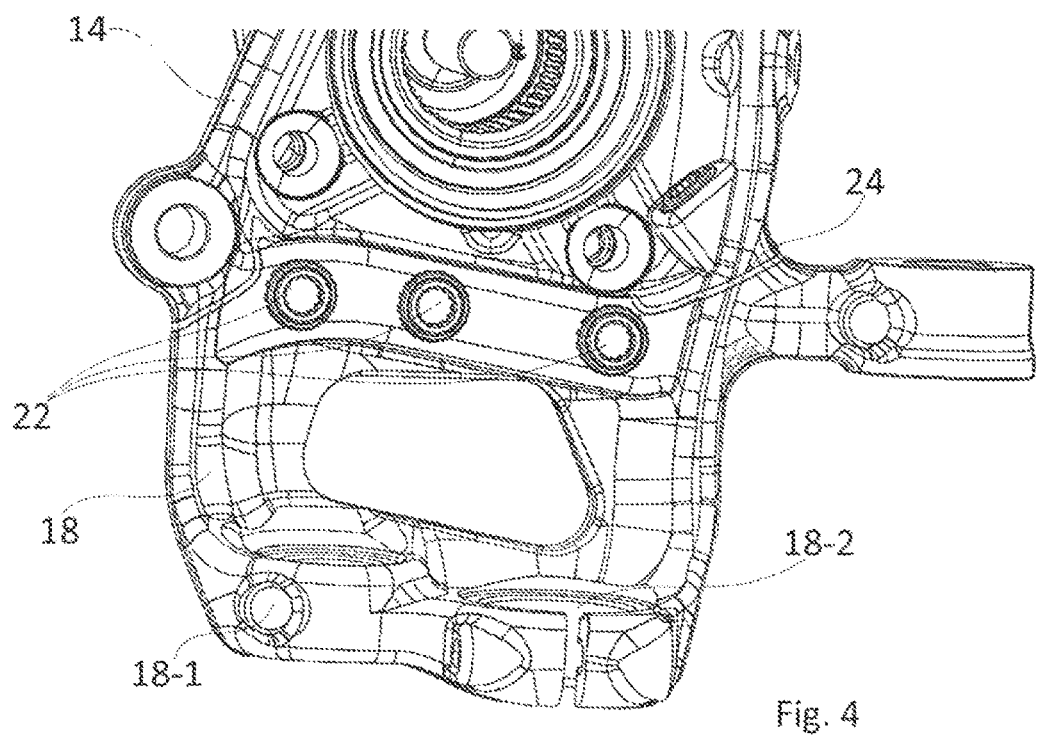
FIG. 4 an enlarged rear view of the lower link connection region of the wheel carrier of FIG. 1, and FIG. 5 the lower link connection region of FIG. 4 in a partial sectional view.

In this case, the upper link connection region 16 as well as the lower link connection region 18 are respectively designed as separate components which are detachably connected by means of a fastening means 20, 22, see FIG. 2 and FIG. 4, to the wheel carrier 12 carrying the base part 14. The fastening means 20, 22 are in the present case formed as screws.

This ensures in an advantageous manner a reduction of the variance because the wheel bearing 12 carrying the base part 14 can be maintained as is for different model series and for the installation of the wheel carrier 12 in different model series by simply using only a structurally less complex adjustment of the upper and/or of the lower link connection regions 16, 18.

Figure 3:
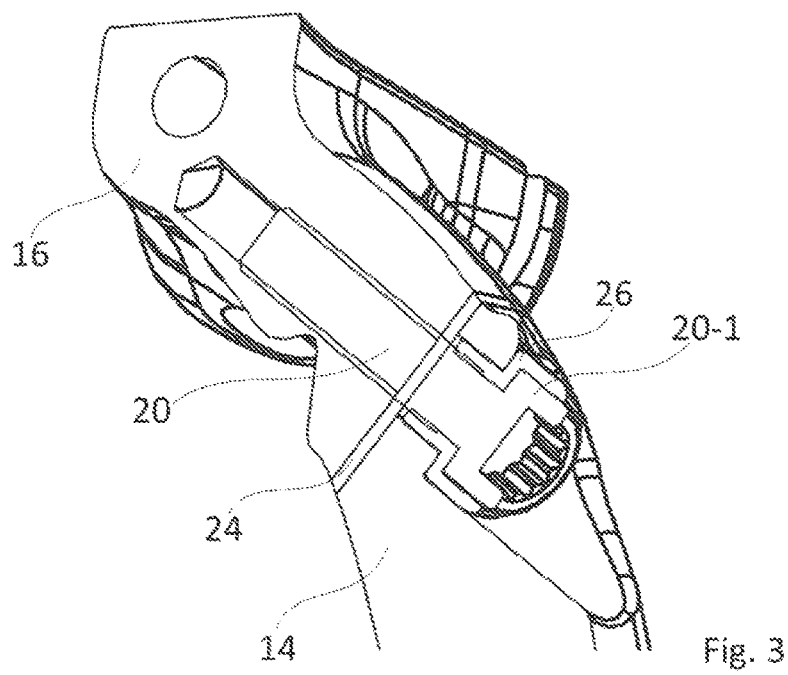
FIG. 3 a sectional view along the line A-A of FIG. 2.
Figure 5:
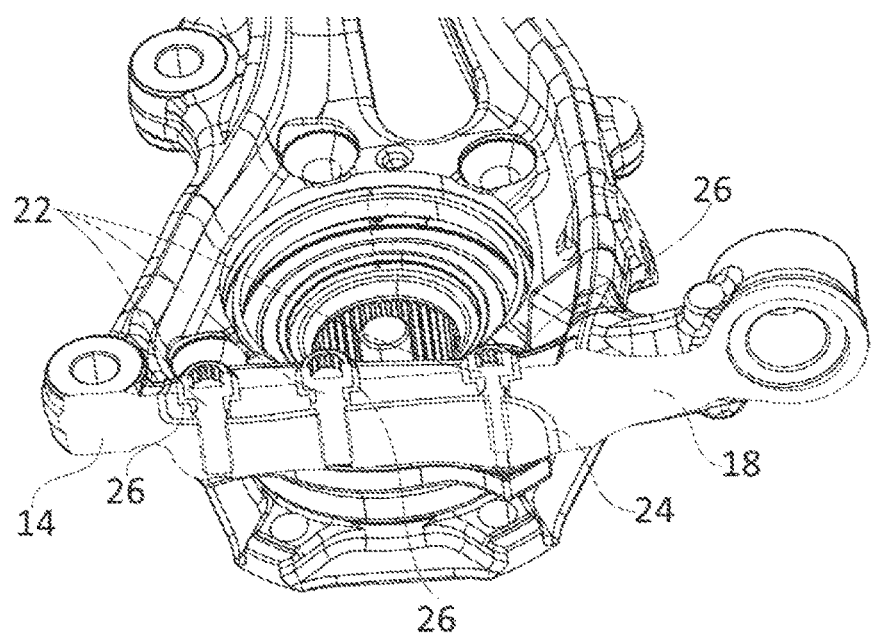

In addition, as can be seen from FIG. 1, and in particular from FIG. 3 and FIG. 5, a decoupling element 24, which is respectively formed from an elastomeric material, is arranged between the upper link connection region 16 and the base element 14, as well as between the lower link connection region 18 and the base element 14. Acoustic decoupling is thus ensured in this manner in an advantageous manner.

In addition, as can be seen from FIG. 3, a decoupling element 26, which is formed from an elastomeric material, is arranged between the screw head 20-1 of the screw 20 and the adjacent base element 14 in order to eliminate a transmission path by means of tensioning the screw head 20-1 against the base element 14. A corresponding decoupling layer is also assigned to the screws 22.

The invention claimed is:

1. A wheel carrier for a motor vehicle, comprising
a base element supporting a wheel bearing,
at least one bearing point for a detachable connection to a link provided with a first link connection region,
at least one bearing point for a detachable connection to a link provided with a second link connection region, wherein the first link connection region and the second link connection region are designed as separate components and that the first link connection region and the second link connection region are detachably connected by a fastening means to the base element, and wherein a decoupling element is arranged between the base element and the first link connection region and the second connection region.

2. The wheel carrier according to claim 1, wherein the decoupling element is formed from an elastomeric material.

3. The wheel carrier according to claim 2, wherein the decoupling element is vulcanized at the base element or at the first link connection region and the second link connection region.

4. The wheel carrier according to claim 1, wherein the decoupling element is designed in the form of a separate insert.

5. The wheel carrier according to claim 1, wherein the fastening means is tensioned against a decoupling layer.

6. The wheel carrier according to claim 5, wherein the decoupling layer is arranged at the base element, or at the first link connection region and the second link connection region, or at the attachment means.

7. The wheel carrier according to claim 5, wherein the decoupling layer is formed from an elastomeric material.

8. The wheel carrier according to claim 1, wherein the fastening means is formed from screws.

* * * * *